Patented Mar. 7, 1939

2,149,961

UNITED STATES PATENT OFFICE 2,149,961

METHOD OF THICKENING LATEX WITHOUT COAGULATION, AND PRODUCT

William H. Holst, Tamaqua, Pa., assignor to Atlas Powder Company, Wilmington, Del., a corporation of Delaware No Drawing. Application November 19, 1937, Serial No. 175,439

6 Claims. (Cl. 18—50)

This invention relates to a method of thickening latex without coagulation, and to the product thereof.

In the manufacture of rubber articles from latex, it is frequently desirable to employ latices of relatively high viscosity. Heretofore, in the preparation of latex for cementing, dipping, spreading, filtration and deposition processing, various materials, such as sodium silicate, glue, gelatin, boric acid, boric acid and glycerine, metallic compounds, as for example, litharge, zinc oxide and ferric oxide, have been added to the latex for the purpose of increasing its viscosity. However, with these thickening agents, various difficulties have been encountered. For example, some of them have insufficient thickening power, others give resulting products of poor stability and some of them provide objectionable foreign materials in the resulting product. In accordance with the present invention, a relatively high increase in the viscosity of the latex may be accomplished without the inclusion of objectionable foreign materials and while retaining the stability of the latex solution.

An object of the present invention is to provide a new and improved process for thickening and increasing the viscosity of latex without coagulation thereof.

Another object is to provide a new and improved, thickened, uncoagulated latex.

Further objects of the invention will hereinafter more fully appear.

In accordance with the present invention, commercial latex containing an alkali, such as ammonium hydroxide, caustic soda or caustic potash, as a preservative, is thickened by admixing the latex with an aqueous solution of an alkali metal salt of mannitol or sorbitol borate, the alkali metal radical of said salt being the same as that of the principal alkali employed as a preservative for the latex, and the alkalinity of the aqueous solution being not less than, and preferably substantially the same as, that of the latex. Although mannitol and sorbitol alkali metal borates, when added directly to latex, tend to coagulate the latex, it has been found that when admixed with the latex in the presence of an amount of water necessary to prevent coagulation, the increase in viscosity effected by the alkali metal borate is much greater than the decrease in viscosity which would result from the added water alone. Consequently, the thickening agent should have water present in an amount sufficient to prevent coagulation of the latex and insufficient to overcome the thickening action of the mannitol or sorbitol alkali metal borate. Within these limits, the increase in viscosity may be readily controlled by variation of the proportion of thickening agent to latex, as well as by variation of the proportion of alkali metal borate to water employed in the thickening agent.

The mannitol and sorbitol alkali metal borates employed in the thickening agents may be readily prepared in accordance with the process disclosed in the co-pending application of Clarence Bremer, Serial No. 196,387, filed March 17, 1938, for "Process of preparing hexahydric alcohol borates". Preferably, a mixture of mannitol or sorbitol and boric acid is heated to a temperature at which water of condensation is evolved, until two or more molecules of water of condensation are removed. The melt is then cooled and the desired alkali metal hydroxide added until a pH corresponding to the pH of the latex to be treated is obtained. However, the preparation of hexitol borates of the desired pH is not to be considered as limited in this respect. The alkali metal hydroxide may be employed as a starting material in the reaction mixture if so desired, or the alkali metal salt of boric acid, such as ammonium borate, sodium metaborate, sodium tetraborate, sodium perborate, potassium metaborate, and the like, may be employed as a starting material in place of all or a part of the boric acid.

Mannitol and sorbitol alkali metal borates thus prepared are readily soluble in water to form a thickening agent for the latex. It is to be understood, however, that in the preparation of the thickening agents, acidic mannitol or sorbitol borate of pH 2 may be prepared, dissolved in water, and thereafter alkalized; or, if so desired, acidic mannitol or sorbitol borate may be dissolved directly in an aqueous solution of the proper alkali metal hydroxide.

An example of the preparation of ammonium mannitol borate for dissolution in water to form a thickening agent for latex solution preserved with ammonium hydroxide and having a pH of 8.5 is as follows:

Example 1

One mol (182 g.) mannitol and one mol (62 g.) boric acid were dissolved in ten mols (180 g.) water. This solution was heated at 115–120° with stirring until all the water of solution as well as 2 mols of water of condensation had been volatilized. This mannitol monoborate dicondensation product was cooled to about 90° C. and then treated with ammonia water (27%) until approximately 2.5 mols of $NH_3$ have been added. The water introduced by the neutralization was then driven off by heating, the final evaporation being carried out in an oven at 130° C. As will be noted, an excess of ammonia was used due to the fact that a large amount was lost during the heating. The pH of the product was 8.5 in 25% aqueous solution as determined by comparison with Lamotte's standards.

An example of the preparation of ammonium sorbitol borate for dissolution in water to form a thickening agent for latex preserved with ammonium hydroxide and having a pH of 8.5, is as follows:

Example 2

One mol (182 g.) crystalline sorbitol and one mol (62 g.) boric acid were dissolved in ten mols (180 g.) water. This solution was heated at 115-120° C. until all the water of solution as well as two mols of water of condensation had been volatilized. This sorbitol monoborate dicondensation product was cooled to about 90° C. and then treated with ammonia water (27%) until approximately 2.5 mols of $NH_3$ had been added. The water introduced by neutralization was then driven off by heating, the final evaporation being carried out in an oven at 130° C. As will be noted, an excess of ammonia was used due to the fact that a large amount was lost during the heating. The pH of the product was 8.5 in 25% aqueous solution as determined by comparison with Lamotte's standards.

In Table A is set forth a comparison of the viscosity of 85% latex solution ammoniated to a pH of 8.5 with viscosities of the uncoagulated latex solution after treatment with thickening agents prepared from the alkali metal mannitol and sorbitol borates of Examples 1 and 2. The thickening agents were prepared by dissolving the borates in the water while heating to 75° C. Thickening of the latex was accomplished by stirring the latex into the thickening agent, while it was still warm (50° C.). The viscosity measurements represent unit time of flow of the liquids at 25° C. through the same straight tube of internal diameter 4 mm. and height of fall 160 mm.

Table A

| Latex | Thickening agent | | | Viscosity |
|---|---|---|---|---|
| | Water | $NH_4$ mannitol borate | $NH_4$ sorbitol borate | |
| Grams | Grams | Grams | Grams | |
| Untreated | | | | 2.0 |
| 20 | 5 | 5 | | 5.0 |
| 20 | 5 | | 5 | 3.4 |
| 20 | 7 | | 7 | 4.0 |
| 20 | 10 | | 10 | 4.2 |
| 20 | 2.5 | | 5 | 6.2 |

It can be seen from the foregoing that aqueous solutions of properly alkalized mannitol and sorbitol borates make excellent thickening agents for latex. It is a requirement that the alkali metal radical of the mannitol or sorbitol borate be the same as that employed as the principal preservative for the latex. For example, latex of pH 8.5 preserved with ammonium hydroxide coagulated when treated with a 50% aqueous solution of sodium mannitol borate of pH 8.5. When the water content of the thickening agent was increased to an amount sufficient to prevent coagulation upon admixture with the latex, substantially no increase in viscosity of the latex was obtained. However, aqueous solutions of sodium mannitol borate may be readily adjusted to a water content sufficient to prevent coagulation of latex preserved with caustic soda and insufficient to overcome the thickening action of the sodium mannitol borate.

In this specification, and the claims appended hereto, by "alkali metal" I mean to include ammonium.

Having fully described the invention, what I claim is as follows:

1. The method of thickening latex preserved with alkali without coagulation which comprises admixing the latex with an aqueous solution of an alkali metal salt of a compound selected from the group consisting of mannitol borate and sorbitol borate, the alkali metal radical of said salt being the same as that of the principal alkali employed as a preservative for the latex, and the alkalinity of the aqueous solution being not less than the alkalinity of the latex, said aqueous solution having water present in sufficient amount to prevent coagulation of the latex upon admixture of the solution therewith.

2. The method of thickening latex preserved with alkali without coagulation which comprises admixing the latex with an aqueous solution of an alkali metal salt of a compound selected from the group consisting of mannitol borate and sorbitol borate, the alkali metal radical of said salt being the same as that of the principal alkali employed as a preservative for the latex, and the pH of the aqueous solution being the same as the pH of the latex, said aqueous solutions having water present in sufficient amount to prevent coagulation of the latex upon admixture of the solution therewith.

3. The method of thickening latex preserved with ammonium hydroxide without coagulation which comprises admixing the latex with an aqueous solution of an ammonium salt of a compound selected from the group consisting of mannitol borate and sorbitol borate, the alkalinity of the aqueous solution being not less than the alkalinity of the latex, said aqueous solution having water present in sufficient amount to prevent coagulation of the latex upon admixture of the solution therewith.

4. The method of thickening latex preserved with ammonium hydroxide without coagulation which comprises admixing the latex with an aqueous solution of an ammonium salt of a compound selected from the group consisting of mannitol borate and sorbitol borate, the pH of the aqueous solution being substantially the same as the pH of the latex, said aqueous solution having water present in sufficient amount to prevent coagulation of the latex upon admixture of the solution therewith.

5. A thickened uncoagulated alkali-preserved latex and containing an alkali metal salt of a compound selected from the group consisting of mannitol borate and sorbitol borate, the alkali metal radical of said salt being the same as that of the principal alkali employed as a preservative for the latex.

6. A thickened uncoagulated latex preserved with ammonium hydroxide and containing an ammonium salt of a compound selected from the group consisting of mannitol borate and sorbitol borate.

WILLIAM H. HOLST.